Oct. 3, 1933.  E. D. TICHENOR  1,929,338
CLINICAL THERMOMETER CASE
Filed Dec. 19, 1932
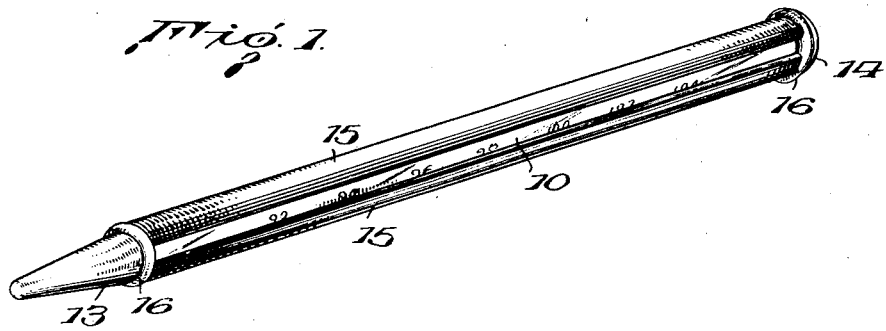
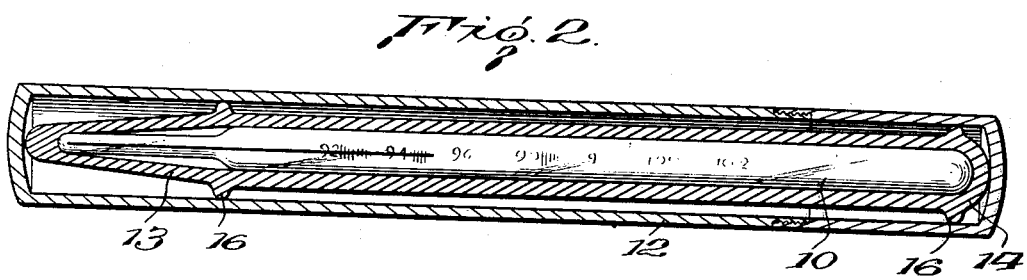
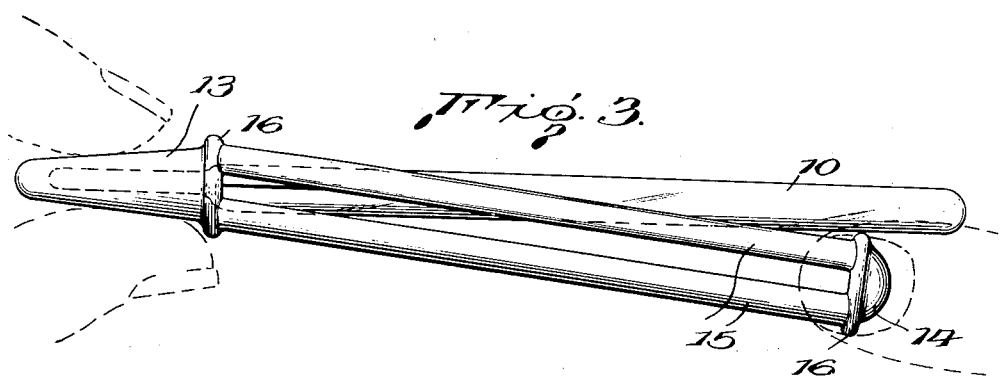
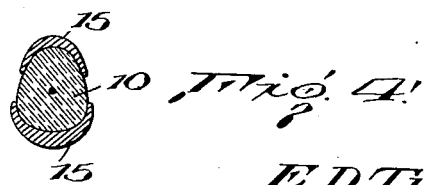
E. D. Tichenor, Inventor
By Church & Church
His Attorneys

UNITED STATES PATENT OFFICE 1,929,338

CLINICAL THERMOMETER CASE

Elmore Drane Tichenor, Detroit, Mich.

Application December 19, 1932
Serial No. 648,018

1 Claim. (Cl. 206—16.5)

This invention relates to improvements in covers for clinical thermometers and particularly to a protective covering for such an article.

Not only are clinical thermometers often broken by reason of the fact that they do not fit snugly in the case in which they are carried, but quite frequently physicians and nurses fail to replace the thermometer in its case each time it is used. As a result, the thermometer lying loose on a desk top or the like is broken. The primary object of the invention, therefore, is to provide a covering for clinical thermometers which will protect the latter from breakage, regardless of whether or not it is in its case.

Thermometer cases also quite generally have caps that are threaded on the core proper and it is to avoid removing and replacing this cap that often times causes the user to leave the thermometer out of its case. In view of this, the present cover is adapted to have the thermometer slipped into it and its construction is such that it will retain the thermometer therein.

With these and other objects in view, the invention consists in certain details of construction and combinations and arrangements of parts all as will hereinafter be more fully described and the novel features thereof particularly pointed out in the appended claim.

In the accompanying drawing:

Figure 1 is a perspective view of a clinical thermometer with the present protector applied thereto;

Fig. 2 is a longitudinal sectional view of an ordinary thermometer case with the thermometer and its protector therein;

Fig. 3 is an elevational view illustrating the mode of applying the thermometer; and Fig. 4 is a transverse section of the thermometer within the protector.

Generally, clinical thermometers are normally kept in cases, but quite frequently physicians, nurses or others using the thermometer fail to replace it in its case but leave it lying on a table, desk or the like. Under both conditions, however, the thermometer is often broken. In the present instance, a protector is provided to eliminate this breakage.

Referring to the drawing, the thermometer 10 is provided with a protector which will practically eliminate all liability of the thermometer being broken, regardless of whether or not it is kept in its case 12.

Preferably, said protector consists of a base 13 and a cap 14, said base and cap being attached to each other by a plurality of connecting elements or strips 15. The base and cap are of hollow construction or formed with what may be termed sockets, in which the ends of the thermometer are received and the connecting strips 15 are of resilient or extensible material, such as rubber. As illustrated in Fig. 3, the normal overall length of the protector is less than the length of the thermometer but due to the extensibility of said strap-like members, the protector can readily be elongated to accommodate the thermometer as shown in Figs. 1 and 2. The cap and base may be made of any suitable material, but rubber is preferred, as the article being made of a single material, it can be more economically produced. Furthermore, an all-rubber construction affords greater protection on account of possessing maximum cushioning properties.

It will be noted that the connecting strips 15 are spaced from each other so as to permit the ends of the thermometer, to be inserted in the base and cap of the protector. While only two connecting strips are shown in the present instance, it will be apparent that this number of strips may be varied.

It is also preferred to form projections, usually annular beads 16, on both the cap and base members. These projections or beads prevent the major portion of the protector coming in contact with the interior of the case 12 or with the surface on which the thermometer may be placed when not in its case.

The ease with which the thermometer may be placed within the protector will tend to eliminate the practice often indulged in of leaving the thermometer loose on a desk or table and consequently will tend to reduce breakage of clinical thermometers caused by this more or less careless practice. The use of the protector, in conjunction with the usual thermometer case, will also tend to eliminate breakage.

What I claim is:

A protector for clinical thermometers composed of base and cap members adapted to fit over the ends of the thermometer, resilient, extensible elements connecting said cap and base members, said elements being spaced from each other circumferentially of the thermometer and normally of less length than the thermometer, and radial projections on said cap and base members.

ELMORE DRANE TICHENOR.